United States Patent [19]

Papp

[11] Patent Number: 5,024,413
[45] Date of Patent: Jun. 18, 1991

[54] SPRUNG BICYCLE SEAT POST

[76] Inventor: Karel Papp, Saumweg 2, Gebenhofen, 8901 Affing, Fed. Rep. of Germany

[21] Appl. No.: 485,502

[22] Filed: Feb. 27, 1990

[30] Foreign Application Priority Data

Feb. 28, 1989 [DE] Fed. Rep. of Germany ... 8902327[U]

[51] Int. Cl.[5] .............................................. A63K 3/00
[52] U.S. Cl. ................................... 248/623; 248/601; 267/132; 297/209
[58] Field of Search .............. 248/600, 623, 622, 601, 248/160; 297/209, 211, 208; 267/132

[56] References Cited

U.S. PATENT DOCUMENTS

| 498,394 | 5/1893 | Huennekens | 297/209 X |
|---|---|---|---|
| 612,215 | 10/1898 | Ross | 297/211 |
| 626,396 | 6/1899 | Smith | 248/601 X |
| 642,606 | 2/1900 | Haider | 248/601 X |
| 962,443 | 6/1910 | Loudenclos | 267/132 |
| 1,849,937 | 3/1932 | Lander | 248/600 X |
| 2,601,886 | 7/1952 | Randolph | 248/600 X |
| 4,648,734 | 3/1987 | Daus, Jr. et al. | 248/622 X |

FOREIGN PATENT DOCUMENTS

| 3436070 | 2/1986 | Fed. Rep. of Germany . |
|---|---|---|
| 8804400 | 3/1988 | Fed. Rep. of Germany . |
| 872359 | 6/1942 | France . |
| 917433 | 1/1947 | France . |

Primary Examiner—Karen J. Chotkowski
Attorney, Agent, or Firm—Oliff & Berridge

[57] ABSTRACT

A seat post includes a seat mounting supported for lengthwise-displacement and a compression spring co-operating between the seat mounting and its support. The support for the seat mount has a main part to be secured to the bicycle and upper and lower flanges. The seat mounting includes a channel section which slightably engages the upper flange of the support. A guide rod extends from the seat mounting and is slidingly received in the upper and lower flanges of the support. The spring is located between the bottom of the seat mount and the lower flange. The foregoing construction provides optimum ride comfort that can be achieved with a simple design.

12 Claims, 2 Drawing Sheets

SPRUNG BICYCLE SEAT POST

FIELD OF THE INVENTION

The invention relates to a sprung bicycle seat post for spring mounting of a seat on a bicycle frame.

BACKGROUND OF THE INVENTION

German OS 34 36 070 already teaches the provision of a sprung mount using a tubular seat post guided telescopically in the seat tube of the frame, with a compression spring located in the seat tube, on which spring the seat post rests. In order to guide the seat post in a nonrotatable but lengthwise-displaceable manner in the seat tube, the seat tube has an axial slot that extends over the spring travel distance, in which a nose of the seat post engages. This very primitive, known design, however, has the disadvantage that, firstly, a certain amount of lateral play is functionally necessary between the nose of the seat post and the axial guide slot in the seat tube, and therefore a corresponding amount of rotational play of the seat is necessarily provided. This rotational play, however, has a relatively strong influence on the seat because the diameter of the seat post is relatively small, so that the user always has the sensation of sitting on a wobbly seat. Secondly, however, there is considerable friction between the nose of the seat post and the guide slot in the seat tube, which may possibly lead to rattling movements of the spring and, in any event, causes severe wear. The principal cause is that, when the bicycle is being ridden, the seat is stressed alternately from either side because the legs must exert pressure alternately on the pedals and therefore a reactive force with a laterally directed component acts on the seat, with the consequence that the nose is forced alternately against first one side of the slot then the other, creating increased friction there, which is eventually bound to lead to lateral deformation of the slot. Apart from this, the known design also has the disadvantage that rainwater and dirt can penetrate the seat tube through the guide slot and, inside the latter, not only can cause contamination of the spring but especially corrosion thereof, without any advantageous provision for cleaning or remedying the situation.

German Utility Model 88 04 400 proposes a sprung seat post in which the seat support is forked and has two parallel support legs extending symmetrically on either side of the seat post axis, with a spring shock absorber with tubular housing associated with each of said legs, with the two spring shock absorber housings being removable and height-adjustable by means of a clamp mounted on the seat tube. This known sprung seat post remedies the disadvantages of the seat post which is known and described above, because the forked seat support with the spring shock absorbers mounted on either side produces a sprung guidance for the seat which is free of rotational play, producing excellent ride comfort; moreover, the spring shock absorbers are encapsulated in their housings.

The latter sprung seat post represents an excellent technical solution to the stated problem and also exerts an outstanding spring action between the seat and the bicycle frame, with optimum riding comfort for the rider. Its sole disadvantage is that it is relatively expensive to build.

SUMMARY OF THE INVENTION

Hence, the object of the invention is to design a sprung bicycle seat post of the type discussed above such that optimum ride comfort can be achieved with simple design.

In accordance with the invention, the seat post includes a seat mounting supported for lengthwise-displacement, with a compression spring cooperative between the seat mounting and its support. The support for the seat mount has a main part, to be secured to a bicycle, and upper and lower flanges. The seat mounting includes a channel section which slidingly engages the upper flange of the support. A guide rod extends from the seat mounting and slidingly received in the upper and lower flanges of the support. The spring is located between the bottom of the seat mount and the lower flange.

The invention will now be described with reference to one embodiment referring to the attached drawings in greater detail.

DESCRIPTION OF THE PREFERRED EMBODIMENT

Figure 1:
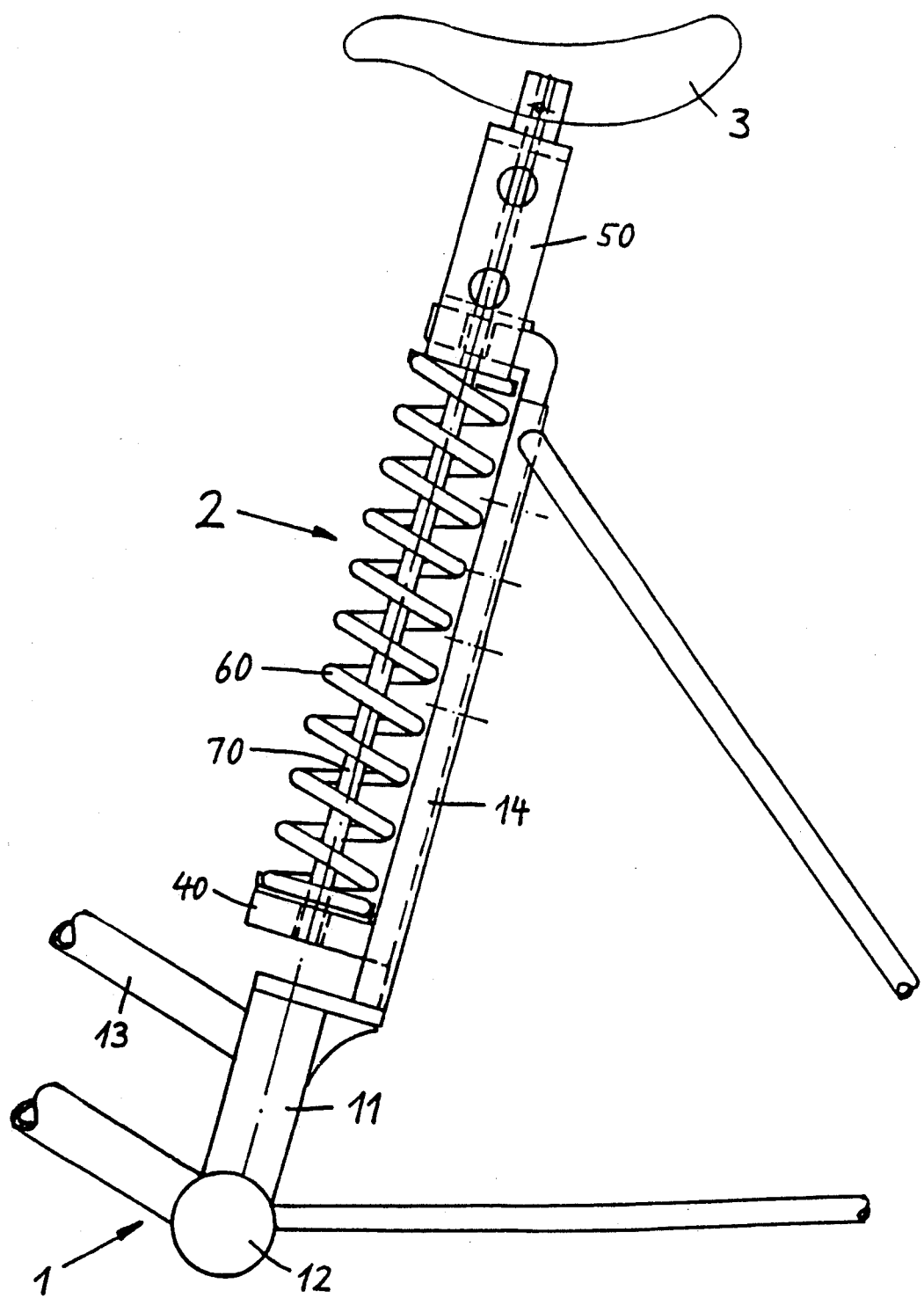
FIG. 1 is a side view of the sprung seat post with the seat mounted on a bicycle frame shown in a cut-away view.

FIG. 1 shows the bicycle frame at 1, the sprung seat post at 2, and the seat at 3. The seat tube 11 of frame 1 extends upward from crank bearing 12 only for a relatively short distance in tubular form, is connected in the vicinity of its upper end with downtube 13 of the frame, and then merges with a mounting plate 14, which extends upward parallel to the axis of seat tube 11 but is staggered slightly rearward therefrom, and serves for mounting the actual sprung seat post 2 so that the axis of seat post 2 coincides with the axis of seat tube 11.

Figure 3:
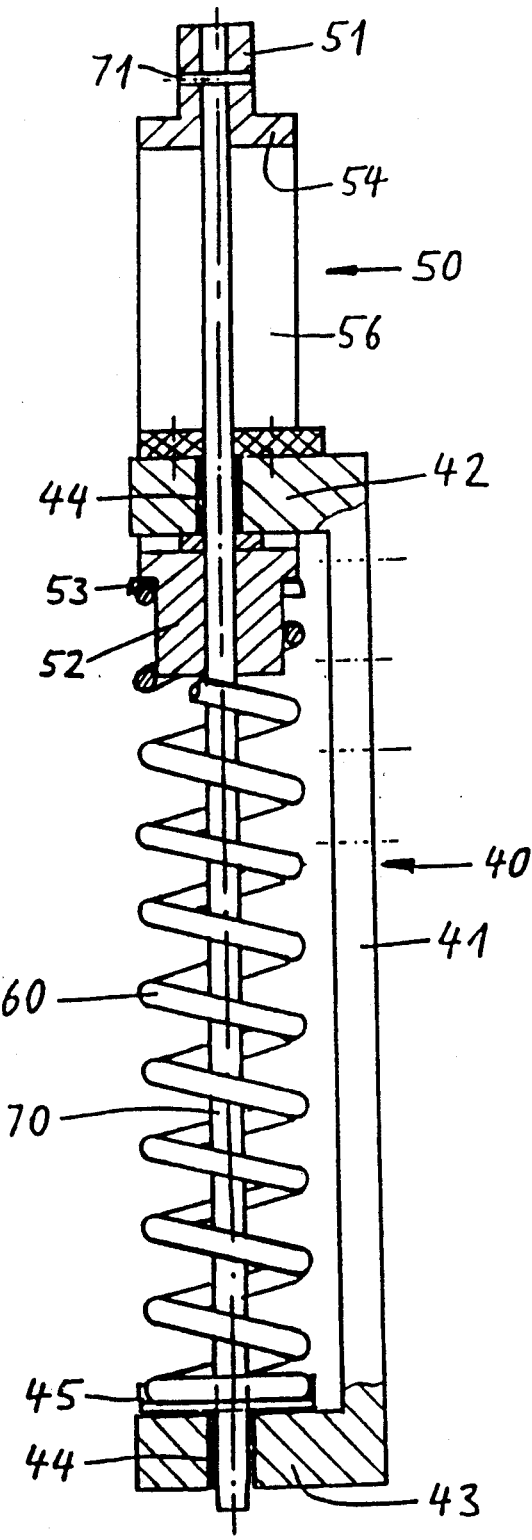
FIG. 3 shows the seat post, also in a partially cut-away view, in a side elevation.

Seat post 2 (see FIG. 3 in particular) comprises a bracket 40, mounted on mounting plate 14, a seat support 50 supporting seat 3, a spring 60, and a guide rod 70. Bracket 40 and seat support 50 are preferably made of cast aluminum. Bracket 40 is mounted on mounting plate 14 advantageously by means of two mounting screws (not shown) which advantageously pass through the holes made in the mounting plate and are screwed into threaded holes in bracket 40. In order to enable bracket 40 to be mounted at different height positions on mounting post 14 to adjust the height of seat 3, at least one of the two parts, the mounting post or the bracket, is provided with a row of holes, which are separated by a fixed height adjustment interval. The other of the two parts, the mounting post or the bracket, then requires only two holes.

Bracket 40 has a plate-shaped part 41 which abuts mounting plate 14 and an upper flange 42 as well as a lower flange 43. Holes with inserted slide bushings 44 are provided in the two flanges for displaceable guidance of guide rod 70. Alternatively, linear ball bearings can be used instead of slide bushes 44. In this case, rod 70 must be hardened. Lower flange 43 also has a spring cup 45 for centering and supporting the lower end of spring 60.

Figure 2:
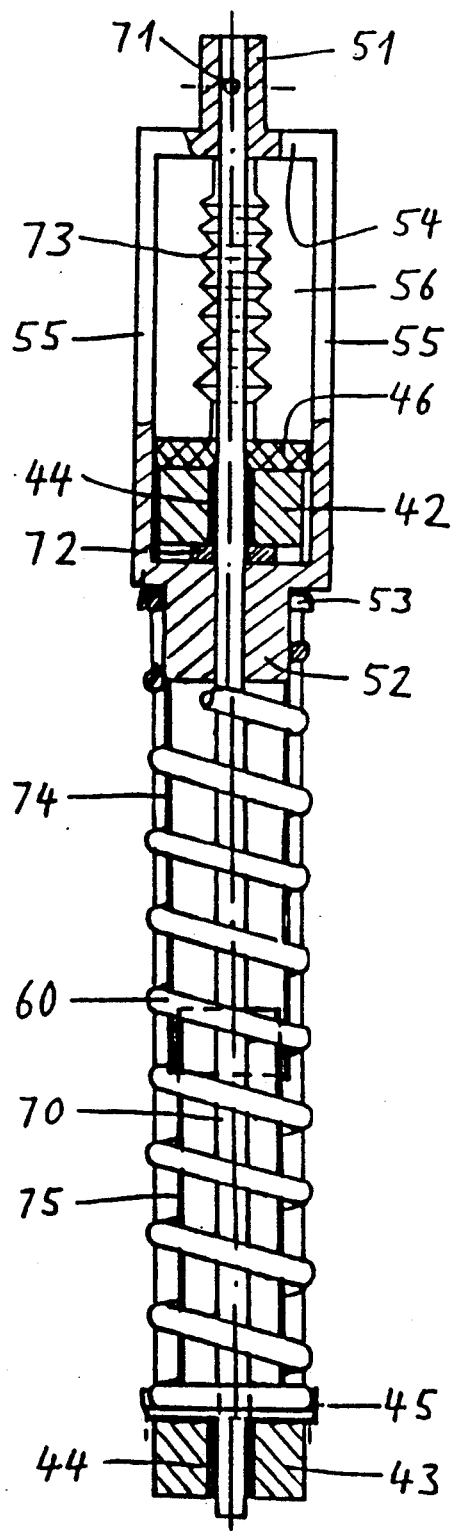
FIG. 2 shows the sprung seat post without the seat and without the frame, partially cut away in a front view.

Seat support 50 has at its upper end a pin 51 for mounting the seat and at its lower end, a pin-shaped projection 52 onto which the upper end of spring 60 is slid and which also carries an upper cup spring 53 for centering and supporting the upper end of spring 60. Between upper pin 51 and lower projection 52, seat support 50 has the shape of a box-like guide body 54 with two flat side walls 55, which run parallel to each other lengthwise along the seat post and are arranged symmetrically on either side of the lengthwise axis of seat post 2 and seat tube 11. Guide body 54 is open at the front and rear, as is clearly shown in FIG. 3, and, as FIGS. 2 and 3 indicate, upper flange 42 of bracket 40 engages guide channel 56 between the two side walls 55 of guide body 54. It traverses this guide channel for its entire depth and, as shown in FIG. 2, has side walls which are parallel to each other and to side walls 55, but however has a certain amount of play with respect to side walls 55 in order to avoid metal-to-metal friction. On its upper side, upper bracket flange 42 has a slide 46 made of a low-friction and low-wear plastic, polyamide for example, which cooperates in sliding fashion with its side surfaces against the inner wall surfaces of the two side walls 55.

Seat support 50 also has a central lengthwise bore which traverses the upper and lower end areas of guide body 54 with pin 51 and projection 52, to receive guide rod 70. Guide rod 70 is connected in fixed relationship with seat support 50, for example in the area of upper pin 51, (or also in the vicinity of projection 52) by a cross pin 71, which can also serve to fix a seat on the seat support 50.

When a load is applied to seat 3, seat support 50, whose lower end abuts the upper end of spring 60, pushes spring 60 down and compresses it, and seat support 50 and guide rod 70 move together relative to fixed bracket 40. Consequently, side walls 55 of guide body 54 slide along the fixed slide 46 connected with upper bracket flange 52 and guide rod 70 moves in guide bushings 44 of the two bracket flanges 42 and 43. The lower end of guide rod 70, which slides out and downward from lower bracket flange 43 when the spring is compressed, then enters seat tube 11 and has unimpeded freedom of movement therein because the free length of seat tube 11 is any event greater than the length of the spring travel. The possible spring travel is thereby determined by the axial length of guide channel 56 of guide body 54.

A buffer 72, for example in the form of a rubber washer, mounted on the underside of upper bracket flange 42 or on the bottom of guide channel 56 of seat support 50, prevents a hard impact when the seat post rebounds when the load is removed from the seat.

To improve its visual appearance and to protect against entry of dust and moisture, guide rod 70, inside guide channel 56 of guide body 54, above slide 46, can be surrounded by a bellows 73 and, in the area below seat support 50, in other words in the vicinity of spring 60 it may be surrounded by a telescopic tube whose telescopic tube sections 74 and 75 are mounted to the seat support or lower bracket flange 43, and are pushed together when the spring moves. Bellows 73 and telescopic tube 74, 75 are shown only in FIG. 2 for the sake of simplicity.

I claim:
1. A sprung bicycle seat post comprising:
   seat mounting means for carrying a seat;
   means for supporting the seat mounting means for guided movement in a lengthwise-displaceable fashion;
   means cooperative between the seat mounting means and the supporting means for preventing relative rotation of one with respect to the other:
   wherein the supporting means is in the shape of a U-shaped bracket with a main part extending lengthwise, and an upper and a lower flange located at respective upper and lower ends of the main part and extending at an angle thereto;
   wherein the seat mounting means has a box-shaped guide body with two parallel side walls forming a guide channel therebetween, said side walls extending in the direction of lengthwise-displacement of the seat mounting means, the upper flange of the supporting means being positioned between the side walls of the guide body and having surfaces engaging the guide channel, the guide body including an upper end section and a lower end section, respectively joining upper and lower ends of the side walls:
   a compression spring disposed between the lower flange of the supporting means and the lower end section of the seat mounting means; and
   a guide rod, extending lengthwise along the displacement axis of the seat mounting means through axially aligned openings in the upper and the lower flange of the supporting means, the guide rod further extending between the upper and lower end sections of the guide body.

2. A seat post as in claim 1 wherein the seat mounting mean is axially fixed on the guide rod and wherein the guide rod is received in bearings carried by the upper and lower flanges of the bracket.

3. A seat post as in claim 1 wherein there is clearance between side surfaces of the upper flange of the bracket and the side walls of the guide body of the seat mounting means which form said guide channel, and wherein the upper flange includes bearing means cooperative with the surfaces of the side walls of the guide channel for producing nonrotatable, lengthwise-displaceable guidance.

4. A seat post as in claim 1 and further comprising a buffer of elastic material disposed between the underside of upper flange of the bracket and the lower section of the guide body of seat mounting means.

5. A seat post as is of claim 1 and further comprising a pair of centering and pressure-distributing cups, one cup being supported on the lower flange of the bracket the other being supported at the lower end section of the seat mounting means, each cup receiving respective ends of the spring.

6. A seat post as in claim 1 and further comprising a bellows disposed about the guide rod and extending above the upper flange of the bracket to the upper end section of the guide body.

7. A seat post as in claim 1 and further comprising a telescopic tube surrounding the guide rod, the telescopic tube being disposed within the spring, the telescopic tube including an upper telescopic tube section mounted on the seat mounting means and a lower telescopic tube section mounted on the lower flange of the bracket.

8. A seat post as in claim 1 and further comprising height-adjustable mounting means on the main part of the bracket.

9. A seat post as in claim 1 wherein the seat mounting means and the supporting means are aluminum or aluminum alloy castings.

10. A seat post as in claim 2 wherein the seat mounting means is fixed to the guide rod by a cross pin for mounting a seat on the seat mounting means.

11. A seat post as in claim 2 wherein said bearings are slide bushes.

12. A seat post as in claim 2 wherein the bearings are linear ball bearings.

* * * * *